No. 826,246. PATENTED JULY 17, 1906.
O. HALVORSEN.
LEVELING STAFF.
APPLICATION FILED MAR. 8, 1906.
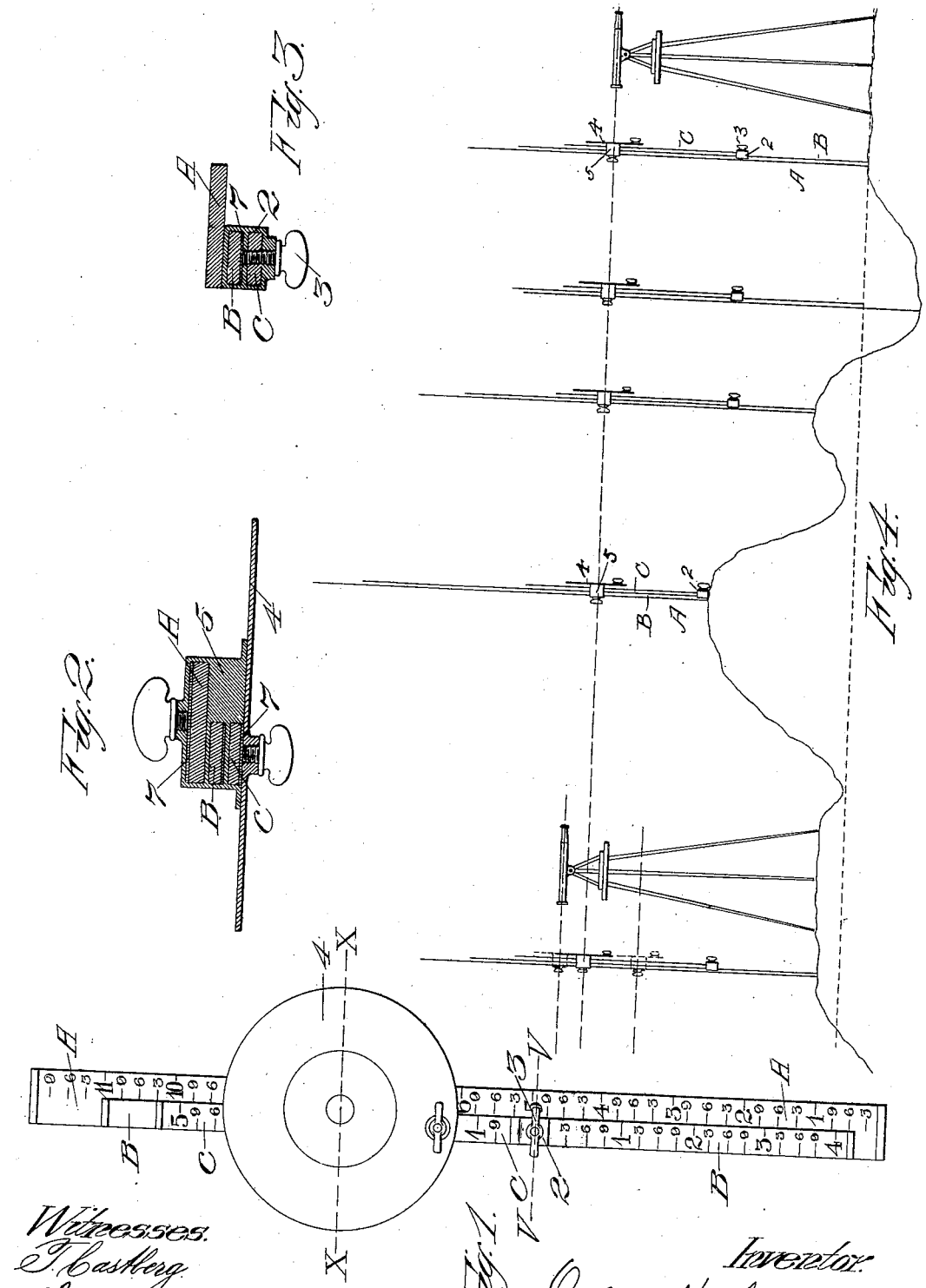

UNITED STATES PATENT OFFICE.

OSCAR HALVORSEN, OF MODESTO, CALIFORNIA.

LEVELING-STAFF.

No. 826,246.   Specification of Letters Patent.   Patented July 17, 1906.

Application filed March 8, 1906. Serial No. 304,859.

*To all whom it may concern:*

Be it known that I, OSCAR HALVORSEN, a citizen of the United States, residing at Modesto, in the county of Stanislaus and State of California, have invented new and useful Improvements in Leveling-Staffs, of which the following is a specification.

My invention relates to a leveling-staff.

It consists in the combination of slidable rods, a target adjustable thereon, and securing devices and in details of construction, which will be more fully explained by reference to the accompanying drawings, in which—

Figure 1 is a front view of the rod and target. Fig. 2 is a transverse section through $x$ $x$ of Fig. 1. Fig. 3 is a transverse section through $v\ v$ of Fig. 1. Fig. 4 is a diagrammatic view showing the rod adjustments for different elevations and depressions.

My invention is designed to provide a multiple-section leveling-staff which is especially designed for recording the undulations of a slightly-varying surface where excavation is to be made for water-carrying ditches.

As shown in the drawings, A is the main rod, B a second rod, and C a third rod. The rod C has its lower end fixed in a socket 2 with a thumb-screw 3, by which it is fixed in the socket, and is also secured to the rod B, which is slidable through the channel formed in the rear portion of the socket 2, the rod B being substantially parallel with the rod C.

4 is a target of any suitable or desired construction, having upon its back a vertically-slotted slide 5, through the two channels in front of which the rods B and C pass and through the rear channel the rod A is slidable.

The rod A is subdivided into any number of feet and inches, as nine or ten feet, with the required subdivisions in inches. This division of the rod commences at 1 at the bottom and terminates in a higher number at the top. The lower portion of the rod B below the clamp 2, which secures the rods together, is subdivided into feet and inches, as shown.

In the use of this instrument, the level being set, the target is fixed upon its rods so as to be at the same level with the cross-hairs of the instrument, the lower ends of A and B resting on the ground and the subdivisions corresponding, and a reading of the rods is taken. If at the first setting of the rod the ground is lower than that occupied by the level, the rod A will be moved by loosening its clamp-screw with relation to the rod B and target until its lower end rests upon the surface of the ground, and the target being correspondingly raised with relation to the rod A until it coincides with the cross-hairs of the leveling instrument it may be fixed, and the bottom of rod B will remain on a level with the original station. A reading on the main rod will show the difference between the levels at the instrument and at the rod by the marks on A which coincide with the bottom of rod B. At the next station there may be a variation one way or the other, and the difference being noted the relative height of that station will be ascertained, and so on until the rod and target arrive at some place where the ground is higher than that at the leveling instrument. The rod B is then slipped down with relation to the rod A until its lower end rests upon the ground. The clamp which holds the rod C to the rod B is then loosened, and the target is moved down with relation to the rods until it is again in line with the cross-hairs of the instrument, and the reading may then be taken on the rod B at the line of the bottom of the rod C, which indicates the elevation of this setting above the position of the instrument. If the next station is still higher than the last, then rod C is moved down until the lower ends of all the rods coincide and rest upon the ground, and that not being sufficient to bring the target into alinement with the level the thumb-screw, which fixes the target to the rod C, is loosened, and the target is moved down on rod C until it is again in line with the level. Before this is done an entry is made of the figure on rod C which coincides with some point, as the top of the target. Then when the target is again in line with the level the figures on the rod C which coincide with the predetermined mark on the target will indicate the distance that the target has been moved. To this must be added the distance which the target was previously lowered, as indicated by the mark on B, to which the rod C was brought to coincide with, and this will show how much higher this point is than the starting-point. If the next station is enough lower to permit, the target is moved to its original place on rod C and clamped, and rod C is then moved to its place on B. If the ground is below the original station, the bottom of rod B will be set to the original line by sliding rod A down until the target is in line with the level.

When it is necessary to reset the level, the leveling-rod is held at its point of last setting until the level is again set, which may be done without regard to the position of the target at that time. If the level is now above the target, the target is loosened from rods A and C, and the rods B and C are held in the position of last reading and the target raised until it coincides with the level. The thumb-screw that holds rod C is then locked, also the one that holds the target to rod A. The rods B and C remain in the same position as before the target was raised, only the latter will partake of this last upward movement, and when again fixed the reading will show the elevations of the level above its previous setting. If the new setting of the level is below its former setting, the rod will be held as before and the target lowered to the line of the level and the screws at front and back of the target again fixed. In order to preserve the surfaces of the rods and the figures from being marred by frequent changes in the positions of the set-screws, thin metal strips 7 are interposed between the surfaces of the rods and the ends of the screws, these strips being carried within the sockets and sufficiently yielding to be easily pressed against the rods and to bind at any point of setting.

Having thus described my invention, what I claim, and desire to secure by Letters Patent, is—

1. A leveling rod or staff, consisting of a main section having a progressive scale marked from the bottom to the top, a second section having a scale increasing downwardly to the bottom, a socket-piece having a channel within which the second section is slidable, a third section having its foot clamped in the socket, said third section being parallel with the second section, a target having a slide fixed to its back, with channels in which the second and third sections are slidable, an independent channel in which the first section is slidable and adjustable with relation to the second and third sections, and locking-screws whereby the parts may be fixed with relation to each other.

2. A leveling-rod consisting of a main section having a scale marked thereon, a second and a third section each having a scale, guides through which said second and third sections are slidable said guides comprising a socket-piece having a channel and a socket respectively for the second and third sections, a target having a slide with independent channels in which each of said sections is slidable, and means for locking the target and sections in relative positions and adjustments.

3. In a leveling-rod, the combination of a target having a slide with parallel and independent channels, a main rod fitting one of said channels, second and third rods parallel with each other and with the main rod and fitting the other of said channels, said main rod having a scale which increases from the bottom upwardly and said second rod having a scale which increases downwardly, a socket-piece having a channel and a socket respectively for the second and third rods, set-screws to fix the relative positions and adjustments of the rods, and compressible shoes located between the faces of the rods and the points of the screws.

In testimony whereof I have hereunto set my hand in presence of two subscribing witnesses.

OSCAR HALVORSEN.

Witnesses:
ANNA M. HALVORSEN,
ADA S. JACKSON.